United States Patent
Arnold

[15] 3,705,349
[45] Dec. 5, 1972

[54] COMPUTER CONTROLLED WIRING NETWORK TEST SYSTEM

[72] Inventor: Wayne E. Arnold, Murrysville, Pa.

[73] Assignee: Westinghouse Electric Corporation, Pittsburgh, Pa.

[22] Filed: Sept. 24, 1969

[21] Appl. No.: 860,475

[52] U.S. Cl. .................................324/73 R, 324/51
[51] Int. Cl. .........................G01r 15/12, G01r 31/02
[58] Field of Search.............................324/73, 51, 66

[56] References Cited

UNITED STATES PATENTS

| | | | |
|---|---|---|---|
| 3,246,240 | 4/1966 | Arnold et al. | 324/73 |
| 3,219,927 | 11/1965 | Topp, Jr. et al. | 324/73 |
| 3,237,100 | 2/1966 | Chalfin et al. | 324/73 |
| 3,250,992 | 5/1966 | Cronkite et al. | 324/66 |
| 3,470,467 | 9/1969 | Cammer et al. | 324/73 |
| 3,492,571 | 1/1970 | Desler | 324/51 X |
| 3,500,457 | 3/1970 | Curley | 324/73 |

Primary Examiner—Rudolph V. Rolinec
Assistant Examiner—Ernest F. Karlsen
Attorney—F. H. Henson, R. G. Brodahl and William J. Wigert, Jr.

[57] ABSTRACT

A system wherein a voltage is applied in sequence to a plurality of terminals on a wired panel, and a computer is employed to scan all other terminals on the panel to determine where the applied voltage appears and does not appear, thereby establishing that connections exist between the terminal or terminals to which the voltage was applied and those scanned terminals where the voltage appeared. The computer then compares the resulting voltages with a master wire list and prints-out any wiring errors. The master wire list may be stored in the computer by the operator or the computer may be utilized to analyze an existing panel or wiring network to obtain the same.

5 Claims, 4 Drawing Figures

| RELAY 1 ENERGIZED | X1 | Y1 | Z1 | X2 | Y2 | Z2 |
|---|---|---|---|---|---|---|
| ENERGIZE A | 1 | 0 | 0 | 0 | 1 | 0 |
| ENERGIZE B | 0 | 0 | 1 | 0 | 0 | 0 |
| ENERGIZE C | 0 | 0 | 0 | 0 | 1 | 0 |

| RELAY 2 ENERGIZED | X1 | Y1 | Z1 | X2 | Y2 | Z2 |
|---|---|---|---|---|---|---|
| ENERGIZE A | 0 | 1 | 0 | 0 | 0 | 0 |
| ENERGIZE B | 0 | 1 | 0 | 1 | 0 | 0 |
| ENERGIZE C | 1 | 0 | 1 | 0 | 0 | 0 |

WITNESSES:
Alfred G. Colaizzi
Leon M. Garman

INVENTOR
Wayne E. Arnold
J. William Wigert Jr.
ATTORNEY

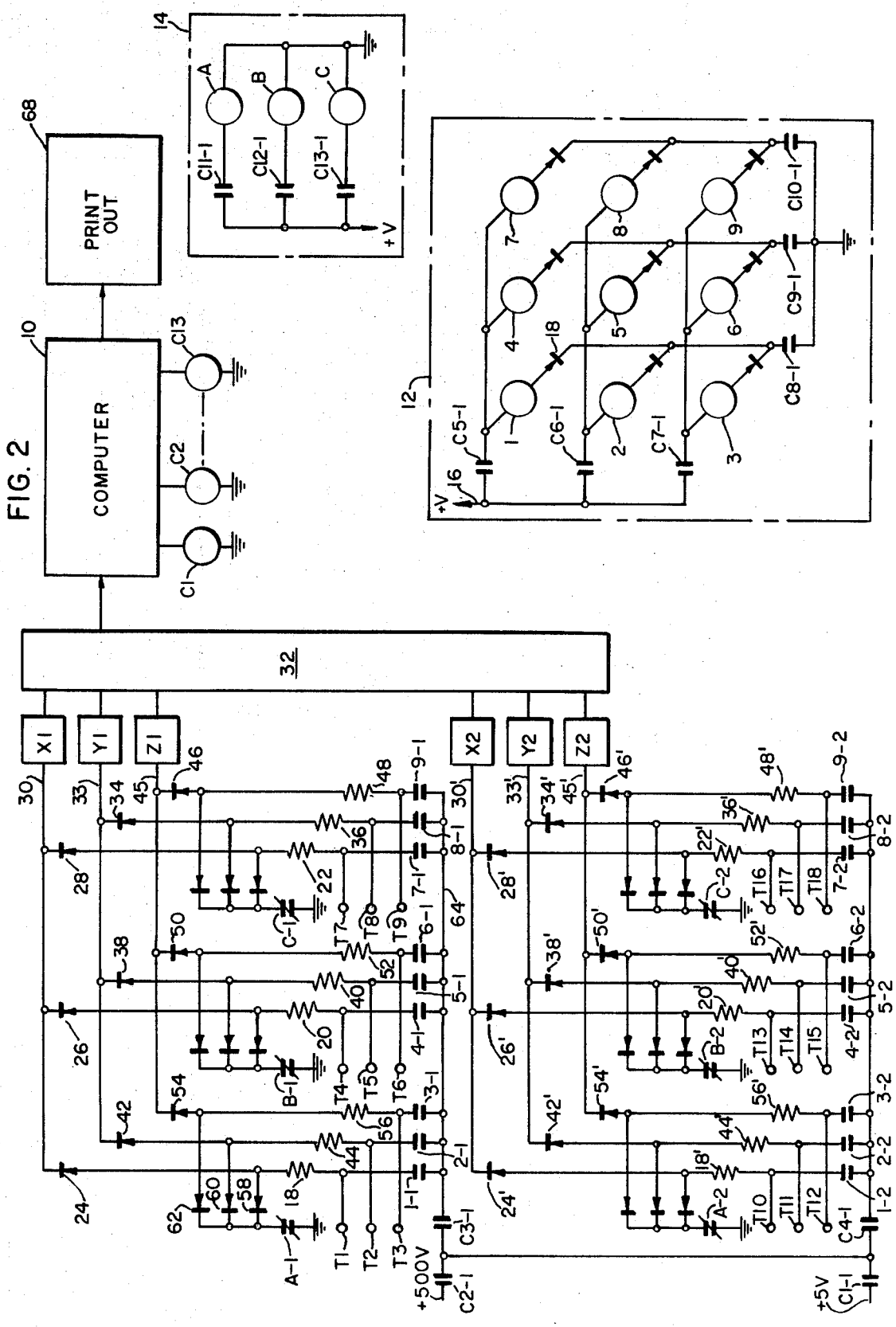

COMPUTER CONTROLLED WIRING NETWORK TEST SYSTEM

BACKGROUND OF THE INVENTION

In the manufacture of electronic systems containing circuit boards and other electronic devices mounted on wired panels, it is desirable to test each completed panel and/or assembly for proper continuity, detection of extra wires and high-potential insulation leakage. At the present time, only simple continuity tests are performed, through the use of a tester consisting of a control unit, a current detector, a power supply and two relay matrices. One matrix applies a voltage from the power supply to a selected terminal of the panel under test, while the second matrix provides a return path to the power supply through that terminal which is supposed to have been wired to the first terminal. If continuity exists, current will flow through the wire and the detector will recognize the current flow and signal the tester control unit that continuity exists. The next terminal is then selected by the first matrix and tested in the same manner. That is, the second matrix provides a return path for the power supplied through the terminal or terminals which are supposed to be wired to that terminal selected by the first matrix. Needless to say, performing a fault isolation, or checking for extra wires with two relay matrices of the type described above requires a rather time consuming search operation and for this reason alone is not altogether satisfactory.

SUMMARY OF THE INVENTION

As an overall object, the present invention provides an improved wired panel test system in which an entire network of wires can be checked in one sequence, thereby enabling tests of wired panels by simpler and faster techniques than are possible with prior art systems for achieving the same result.

Another object of the invention is to provide an improved system for testing a wired panel or network wherein only one input relay matrix is employed and a computer is utilized to determine those points to which a selected terminal is wired.

Another object of the invention is to provide a system for testing a wired panel or network wherein a computer is utilized for determining errors in a wiring network and for providing a print-out indicating the errors.

Another object of the invention is to provide a system for testing a wired panel or network wherein a computer is utilized in analyzing a previously tested network to obtain a master wiring list from which other wiring networks or panels may be tested.

In accordance with the invention, means are provided for applying a potential to individual predetermined test points on a wired panel. In one embodiment, the test points are divided into groups, those test points in each group being connected through diodes to a corresponding input terminal of a digital computer. All test points, however, are normally disconnected from the computer input terminals. If it is assumed that there are three test points in each group, all of the first test points in the respective groups are connected to the computer input terminals first, followed by the second and third test points in each group being connected in sequence. In this manner, a potential will be applied to the computer input terminals from each test point which is wired to that single test point to which an input potential was applied. By observing the sequence in which voltages appear at the input terminals of the computer, the test points with the voltages thereon can be identified and the presence of interconnecting wiring can be established.

After all groups of test points are thus scanned in sequence, the computer, through an input relay matrix, will apply the potential to another test point and the scanning process repeated whereby the computer, by observing the sequence in which potentials appear at its input terminals, can determine the locations of those test points which are wired to the test point to which the input potential is applied. By applying the input potential to all test points in sequence and by repeating the foregoing scanning operation while the input potential is applied to each test point in sequence, the entire panel can be tested.

This test data may be utilized by the computer in several different ways. First, the computer may print out the results of the test on a typewriter, for example. The computer can be programmed according to well known methods to print out the specific wires missing or incorrectly inserted. An operator may then utilize the print out to manually compare the results with the master wiring list. Second, a master wiring list may be stored in the computer, the computer itself then making the comparison between the test panel and the master wiring list and printing out any resulting errors. Third, the test data may be utilized as in the previous manner, with the test results of the first or any other panel or wiring network serving as the master wiring list.

The above and other objects and features of the invention will become apparent from the following detailed description taken in connection with the accompanying drawings which form a part of this specification, and in which:

FIG. 2 is a simplified schematic diagram of one type of testing system in accordance with the present invention;

Figures 1, 3, 4:
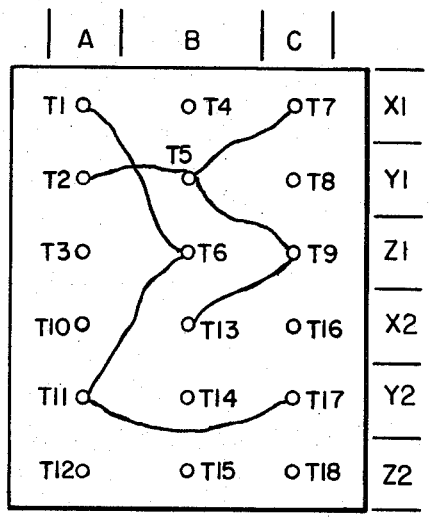
FIG. 1 is a schematic illustration of a circuit panel of the type which may be tested in accordance with the apparatus of the present invention.
FIG. 3 is a table illustrating a typical print-out for one set of conditions applied to the circuit of FIG. 2.
FIG. 4 is a table illustrating a print-out of the computer for another set of conditions for the circuit of FIG. 2.

With reference now to the drawings, and particularly to FIG. 1, a typical circuit board or panel is shown having a plurality of test points or contacts T1–T18 thereon, these points being connected to various electronic components, as is well known to those skilled in the art. For example, such a circuit board might be utilized on a computer back panel. In the illustration of FIG. 1, test point T1, for example, is wired through lead wires to test points T6, T11 and T17. Similarly, test point T2 is wired to points T5, T7, T9 and T13. As will be understood, an actual circuit board may have a much larger number of interwired points, the showing in FIG. 1 being for purposes of illustration only.

The testing system shown in FIG. 2 includes a suitable computer 10 adapted to control a plurality of output switches or relays C1–C13. While they have been shown here as mechanical relays, it is to be understood that other suitable electronic switching devices, particularly solid state types, may be utilized. These switches C1–C13, in turn, are utilized to control a switching matrix, enclosed by broken lines, comprising and identified by reference numerals 12 and 14. In the particular embodiment shown switching matrix 12 includes nine switches or relays numbered 1 through 9. The relay 1, for example, is adapted to be connected between ground and a source of positive potential at 16 through diode 18. All other relays are adapted to be connected between terminal 16 and ground through a similar diode as shown. In order to energize relay 1 it is necessary for the computer to energize relays C5 and C8. This will close normally open contacts C5-1 and C8-1, thereby energizing relay 1. Similarly, in order to energize relay 5, contacts C6-1 and C9-1 must be closed; and in order to energize relay 9, for example, contacts C7-1 and C10-1 must be closed, these contacts being controlled by the relays C7 and C10 connected to the output of the computer 10. The matrix 14 contains three relays A, B and C which are controlled by relays C11, C12 and C13 at the output of computer 10.

As can be seen in FIG. 2, the test points T1–T18 of FIG. 1 are divided into two sections or modules (i.e., T1–T9 and T10–T18), each module containing nine contact points corresponding to the number of switches or relays in matrix 12. Contact points T1, T4 and T7 comprise a group and are connected through resistors 18, 20 and 22 and diodes 24, 26 and 28 to a common lead 30. The lead 30, in turn, is connected through a voltage level discriminator or amplifier X1 and a contact input subsystem 32 to the computer 10. The signal on lead 30, after amplification in discriminator X1, provides one "bit" of information to the computer 32.

It can be seen that in the embodiment of the invention shown in FIG. 2, six inputs are provided to the computer from voltage level discriminators X1, Y1, Z1 and X2, Y2, Z2. The discriminator Y1, for example, is connected through lead 33, diode 34 and resistor 36 to test point T8, through diode 38 and resistor 40 to test point T5, and through diode 42 and resistor 44 to test point T2. Finally, discriminator Z1 is connected through lead 45, diode 46 and resistor 48 to test point T9, through diode 50 and resistor 52 to test point T6 and through diode 54 and resistor 56 to test point T3. The discriminators X2, Y2 and Z2 are similarly connected through diodes and resistors, identified by the same, primed reference numerals as those used in the first section, to the test points T10–T18.

The junction of resistor 18 and diode 24 is adapted to be connected through diode 58 and normally-closed contacts A-1 of the relay A to ground. Similarly, the junction of diode 42 and resistor 44 is adapted to be connected to ground through diode 60 and contacts A-1; while the junction of diode 54 and resistor 56 is adapted to be connected to ground through diode 62 and the normally closed contacts A-1. It can be seen that as long as the contacts A-1 are closed, the contact points T1, T2 and T3 will be grounded and no input signals will reach the computer 10. Similarly, if contacts B-1 are closed, test points T4–T6 will be grounded; if contacts C-1 are closed, test points T7–T9 will be grounded; if contacts A-2 are closed, test points T10–T12 will be rounded; and so on.

If relays C1 and C3 at the output of computer 10 are energized, contacts C1-1 and C3-1 will be energized, thereby applying a potential of +5 volts to lead 64. On the other hand, if contacts C1-1 and C4-1 are closed, the +5 volt potential will be applied to lead 66. This potential on lead 64 or 66 can be increased to +500 volts or more, for reasons subsequently given, by energizing relay C2 rather than relay C1, thereby closing contacts C2-1. Note that negative voltages may also be utilized as test voltages in the present embodiment.

The potential on lead 64, for example, is adapted to be applied to any one of the test points T1–T9 through contacts 1-1 through 9-1 for the relays 1 through 9 in matrix 12. Similarly, the potential on lead 66 is adapted to be applied to any one of the test points T10–T18 through contacts 1-2 through 9-2 of the same relays 1 through 9 of the matrix 12. As will be seen, however, contacts C3-1 or C4-1 are never energized at the same time, meaning that a potential will be applied to one, and only one, of the test points T1–T18.

In the normal operation of the aforesaid embodiment, the relays C1–C13 at the output of the computer 10 are energized in a sequence such that relay 1 is energized first, followed by sequential energization of relays A, B and C. This is followed by energization of relays A, B and C. In other words, the relays 1-9 are energized in sequence, and after each relay is energized and before the next relay in matrix 12 is energized, the relays A, B and C in the matrix 14 are sequentially energized.

Let us assume, for example, that contacts C5-1 and C8-1 are closed, thereby energizing relay coil 1. At the same time, relay contacts C3-1 and C1-1 are closed, while contacts C4-1 are open, thereby applying a +5 volt potential to lead 64. With relay coil 1 energized, contacts 1-1 close, thereby applying a +5 volt potential to test point T1. At this precise time, however, no output signals appear on lead 30 since contacts A-1 are closed and the junction of diode 24 and resistor 18 is grounded.

Now, in accordance with the above described sequence, the relays A, B and C are energized in succession. When relay A is energized, contacts A-1 open and a +5 volt potential appears on lead 30. This is amplified in discriminator X1 and applied to computer 10 as a binary ONE input. Revering again to FIG. 1, it can be seen that point T1 is connected to points T6, T11 and T17. Consequently, a potential of +5 volts should also exist on these points.

Note that when relay A is energized, the contacts A-2 will also open. Consequently the +5 volt potential applied to point T1 should appear at point T11. Accordingly, this information in the form of a binary ONE is transmitted to the computer 10 via discriminator Y2. Similarly, when relay B is energized next in succession, the +5 volt potential should appear at point T6 since it is connected to terminal T1. The presence of this potential will be transmitted to the computer 10 to the discriminator Z1 as a binary ONE input signal. Finally, when relay C is energized, contacts C-2 open and a +5 volt potential is applied through resistor 36' and diode 34' to discriminator Y2 as yet another "bit" input to the computer.

After the relays A, B and C have thus been energized in sequence, relay 1 in matrix 12 is deenergized and relay 2 is energized, thereby closing contacts 2-1. At this time, contacts C3-1 remain closed and, consequently, a +5 volt potential is applied to test point T2. In FIG. 1, we see that point T2 is connected to points T5, T7, T9 and T13. Consequently, when relay A is again energized, a +5 volt potential will be applied through resistor 44 and diode 42 to discriminator Y1; when relay B is energized, a +5 volt potential will be applied through resistor 40 and diode 38 to discriminator Y1 and through resistor 22 and diode 28 to discriminator X1 as well as through resistor 48 and diode 46 to discriminator Z1.

The foregoing process is shown graphically in FIGS. 3 and 4. In FIG. 3, it is assumed that relay 1 is energized. When relay A becomes energized, binary ONE inputs are provided to the computer from the outputs of discriminators X1 and Y2, indicating a connection of the test point T1 to test point T11. When relay B is energized, binary ONE signals are inputed to the computer from discriminator Z1, indicating a connection to point T6. Finally, when relay C is energized, a ONE output is provided from discriminator Y2, indicating a connection to test pint T17.

The same progress, graphically illustrated in FIG. 4, occurs when relay 2 is energized; however sequential energization of relays A, B and C shows that test point T2 is connected to point T5 (a ONE output from discriminator Y1), point T3 (a ONE output from discriminator X2), point T7 (a ONE output from discriminator X1) and point T9 (a ONE output from discriminator Z1).

After relay 2 is energized, relay 3 becomes energized followed by energization of relay 4, and so on. This will continue until the first nine relays are energized, whereupon contacts C3-1 open and contacts C4-1 close, thereby applying a +5 volt lead 66. The sequential energization of relays 1-9 is repeated, but in this case the +5 volt potential is applied to contacts T10-T18 rather than contacts T1-T9. Of course, after each relay in matrix 12 is energized and before the next one in matrix 12 is energized, the three relays A, B and C in matrix 14 must be energized in sequence.

The application of a low test potential such as +5 volts is to detect continuity in the wired terminals where it is expected, i.e., to determine whether in fact intended connections have or have not been made. It is also desirable to test whether short circuits owing to poor insulation or other defects, which may later arise when higher voltages are used in actual operation of the panel, will occur. This may be determined by application of a much higher potential. Desirably +500 volts or greater may be applied according to the same sequence as previously described with respect to the +5 volt potential. Thus the foregoing procedure is simply repeated over again using the +500 volt potential instead of the +5 volt potential.

It will be readily apparent that the system shown in FIG. 2 can be extended to a larger number of test points. The number of test points which can be accommodated is of course limited only by the inputing capability of computer 10.

The computer 10, of course, is programmed according to well known principles to energize relays C1 through C13 in an order designed to produce the foregoing sequence of operations.

It may be seen that the present invention may be utilized to provide a very flexible system for testing wired networks. Thus in one manner of operation a paper tape or other suitable input media containing a master wiring list is fed into the memory of the computer. The compute selects one of the common points, applies the voltage, scans the other terminals, checks the common points with the wiring list stored in its memory, changes the voltage to 500 volts, repeats the process, and then prints out any errors.

It should be noted that it may not be necessary to apply to every contact or terminal in the network, in order to make a satisfactory check of the wired panel. However, in view of the fact that the present invention utilizes a computer in its operation, it may be seen that because of the speed of operation such computers, it is very easy to apply a voltage to all of the terminals and check each response in a very small amount of time.

It will be appreciated that the system is readily adaptable for self-programming by its ability to provide its own master wiring list. For example, a panel or wiring network, preferably one which has previously been determined to be accurately and correctly wired, is tested in accordance with the previously described principles of the invention. The recorded results of the test, which may be in a form similar to that shown in FIGS. 3 and 4, is then stored in the computer memory for use as a master wiring list. The terminals of the wiring networks to be tested are then scanned as previously described. The responses are recorded and compared with the responses of the correctly wired system which has been stored in the computer as the master wiring list. If any inconsistencies are found, the computer prints out the errors.

Although the invention has been shown in connection with a certain specific embodiment it will be readily apparent to those skilled in the art that various changes in from and arrangement parts may be made without departing from the spirit and scope of the invention.

I claim as my invention:

1. A system for testing the electrical connections among circuit points in a wired circuit comprising: a computer having input and output terminals; first means including a plurality of gating networks for coupling groups of said circuit points to said input terminals, one gating network being coupled between each circuit point group and a corresponding computer input terminal, and each of said circuit point groups having the same number of circuit points therein; second means including a series of switches corresponding in number to the number of circuit points in each of said groups; third means operated by said computer for selectively applying a test voltage to one of said circuit points; and fourth means coupled to said computer output terminals and to said switches and operated by said computer to cause said gating networks to sequentially apply signals to said computer input terminals representing the voltage conditions of successive circuit points in the series of each of said groups.

2. The system defined in claim 1 wherein each gating network in said first means includes a fist series of impedances and diodes coupling each circuit point of the associated group to the associated computer input terminal and a second series of diodes coupling the impedances to a reference potential different from said test voltage.

3. The system defined in claim 1 wherein said computer is operated to compare successive voltage representations in the series of said groups with a stored set of signals representing the proper group output signals for a properly wired circuit.

4. The system defined in claim 1 wherein said groups are separated into a plurality of sets and additional switching means controlled by the computer are provided to switch the test voltage from one set to another.

5. The system defined in claim 1 wherein switching means controlled by said computer are provided for changing the value of said test voltage.

* * * * *